United States Patent [19]

Theysohn

[11] 4,018,550
[45] Apr. 19, 1977

[54] STRIPPING AND DEPOSITING MECHANISM FOR CALENDERED SHEETS

[76] Inventor: Helmuth Theysohn, Weihbergstrasse 25C, 3 Hannover, Germany

[22] Filed: Sept. 26, 1974

[21] Appl. No.: 509,431

[30] Foreign Application Priority Data

Dec. 10, 1973 Germany .......................... 2351265

[52] U.S. Cl. .............................. 425/363; 214/1 BS; 271/94; 425/317; 425/455 R
[51] Int. Cl.² ......................................... B29C 15/00
[58] Field of Search ............ 271/174, 184, 194, 84, 271/85, 196, 94, 95; 425/363, 324 R, 455, 317; 83/13; 214/1 BS

[56] References Cited

UNITED STATES PATENTS

| | | | |
|---|---|---|---|
| 209,683 | 11/1878 | Hird | 271/194 |
| 2,973,549 | 3/1961 | Hurst | 425/363 |
| 3,452,128 | 6/1969 | Rains | 425/363 |
| 3,570,052 | 3/1967 | Reade | 425/363 |
| 3,679,790 | 7/1972 | Alfsen | 425/363 |
| 3,888,359 | 6/1975 | Moline | 271/194 |

FOREIGN PATENTS OR APPLICATIONS

| | | | |
|---|---|---|---|
| 743,380 | 1/1956 | United Kingdom | 271/56 |
| 313,580 | 9/1929 | United Kingdom | 271/363 |

Primary Examiner—Robert L. Spicer, Jr.
Attorney, Agent, or Firm—Robert E. Burns; Emmanuel J. Lobato; Bruce L. Adams

[57] ABSTRACT

In front of a hot horizontal calender roll there is provided a system of suction cups held on arms which can rock about a horizontal pivot parallel to the axis of the roll, to set the suction cups down on an edge portion of a hot calendered sheet. The arms are then rocked back to lift the suction cups and thereby the edge portion of the sheet from the roll. The suction cups thereafter deliver the edge of the lifted-off sheet portion to a system of grippers. The grippers, aided by draw-off roller means rotatable about said pivot, then draw the sheet horizontally away from the calender roll to deposit the sheet on a vertically adjustable table.

5 Claims, 5 Drawing Figures

STRIPPING AND DEPOSITING MECHANISM FOR CALENDERED SHEETS

BACKGROUND OF THE INVENTION

This invention relates to a calender device for the production of calendered rubber asbestos sheets, particularly sealing sheets of the type known as "It sheets".

These sheets are made by applying a liquid or paste of asbestos fibers in rubber onto the heating roll of a calender system and thinning out the applied liquid or paste while vulcanizing it by suitable heating of the roll. The sheet then adheres strongly to the heating roll. In order to remove the sheet from this roll, it is necessary first to make a longitudinal cut in the vulcanized layer on the roll. Thereupon it has been necessary, thus far, to use at least two workers, each of whom had to manually grip an edge portion of the sheet, adjacent the cut, and then to manually draw the sheet from the roll. The workers had to stand in the direct vicinity of the hot calender roll. They had to manually grip and hold the equally hot, calendered sheet. Moreover the drawing off of the sheet had to be done in most cases in the forward rotational direction of the heating roll, at the relatively rapid velocity of this roll's rotation.

Very experienced workers were needed for this operation. Moreover their work was extremely fatiguing. Still further, it often was difficult for them to properly lift the sheet from the roll, particularly when the sheet was relatively thin; these conditions lead to dangers for the workers, who could not only suffer burns on their hands but could also be injured by having their hands caught by the rotating rolls; in addition the operation often was inefficient. Damaged and unusable plates were all too often produced.

SUMMARY OF THE INVENTION

The invention has the object to overcome the above-mentioned difficulties and dangers by a new device and method.

It is another object to improve a calendering system by improved means for lifting and drawing off calendered sheets.

The invention achieves the objects by using a system of suction cups and of mechanical gripper means, both in front of a hot horizontal calender roll. The suction cups are held on arms which can rock about horizontal pivots parallel to the axis of this roll, to set the suction cups down on an edge portion of the hot calendered sheet. The arms and suction cups are then rocked back to lift this edge portion from the heating roll, whereupon the suction cups deliver the edge of the sheet to the gripper means. Mechanical grippers (preferably actuated hydraulically or pneumatically) then draw the sheet horizontally away from the hot calender roll to deposit the sheet on a vertically adjustable table.

Each suction cup and gripper according to the invention does work similarly to that previously done by one of the operators' hands. The suction cups and grippers are insensitive to the high temperatures; thereby their use avoids the dangers previously encountered. Moreover it is possible at minimum expense to provide any suitable number of suction cups and grippers, along the roll, while evidently it was impossible as well as uneconomical heretofore to provide a corresponding number of workers in the limited area available for this work.

In a preferred embodiment of the invention, the work of the suction cups and of the grippers is aided by the use of a pair of draw-off roller means, rotatable about the pivot of the rocking arms which hold the suction cups. Such rollers preferably extend longitudinally throughout the length of the calender roll. Advantageously they are radially shiftable relative to one another over a considerable distance, to make it possible not only to introduce the calendered sheet between these rollers but also to pass the suction cups and their supporting, rocking arms between the draw-off rollers.

According to another preferred feature, means are provided for automatically lowering the table, on which the drawn-off plates are deposited, by suitably small vertical distances. Finally it is preferred to control the coordinated operations of the suction cups, their carrier arms, the grippers, gripper carriers, and the roller system and depositing table by an automatic control system.

DESCRIPTION OF THE PREFERRED EMBODIMENTS

Figure 1:
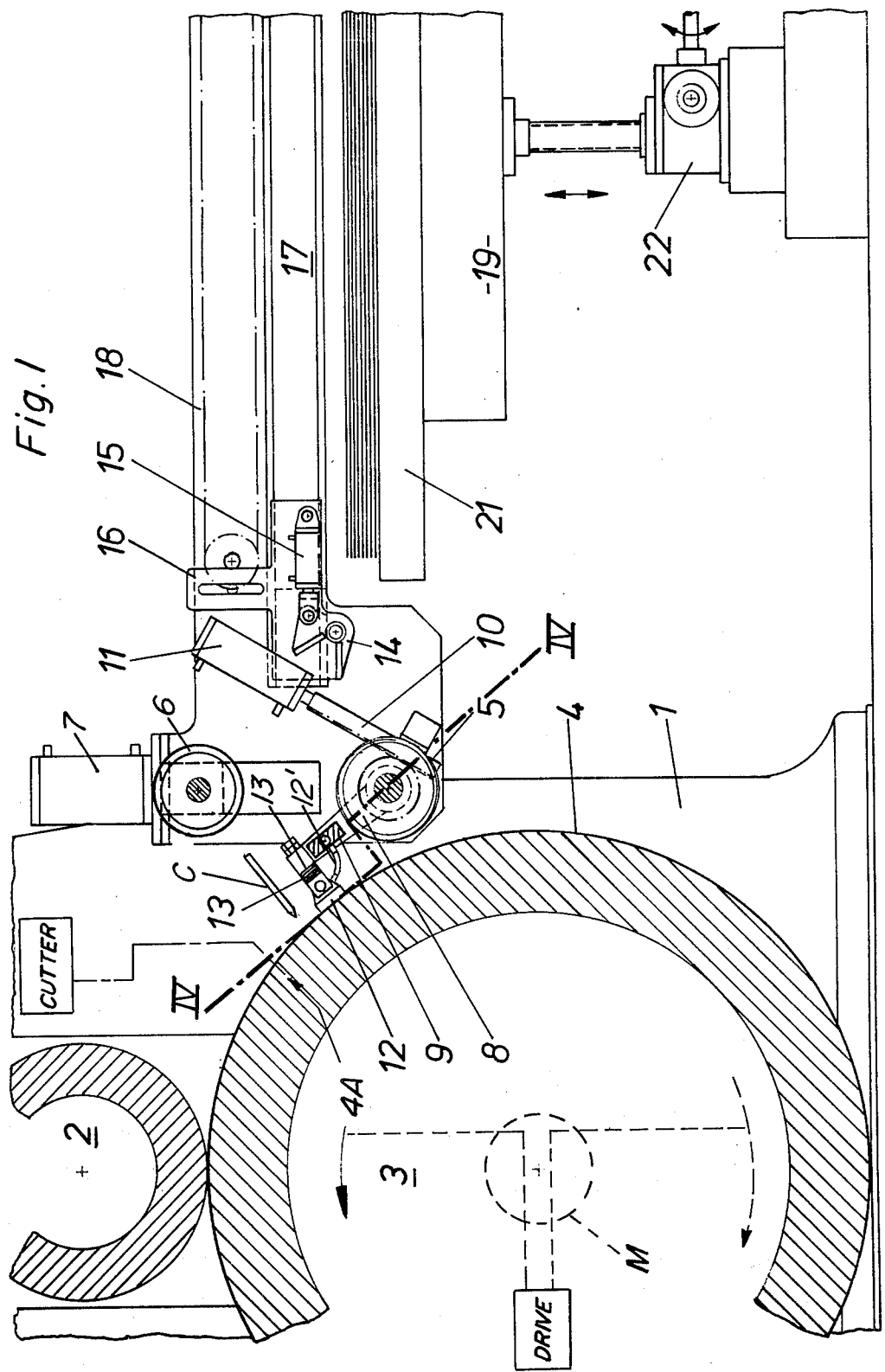
FIG. 1 is a fragmentary side elevation, partly in vertical section, of apparatus according to the invention shown in a first position thereof.

As shown in FIG. 1, calender 1 comprises an upper pressure roll 2 and a lower and larger calendering roll 3. These rolls normally are 1,600 and 3,100 millimeters long. The heating roll 3 preferably has a diameter of 3,500 to 6,500 millimeters, corresponding to the production of calendered sheets of the same length. Asbestos-carrying rubber solution is initially applied at a conveniently accessible side of the calender, at left according to the drawing. The calender roll is then rotated, clockwise by a suitable drive, as schematically indicated by the broken-line arrow in FIG. 1, to reduce the substantial thickness of the initial charge, to an ultimate sheet thickness ranging from about ½ millimeter to about 5 millimeters. A typical temperature of the heating roll 3 and of the calendered sheet 4 is approximately 150° C. The heating of roll 3 is performed by applying hot fluid to the interior of the roller or of the wall of hollow roller; details of the means for applying fluid are not shown as they are irrelevant to the present invention.

The hot calendered sheet 4 initially covers the entire circumference of roller 3. In order to prepare for lifting off and drawing off the sheet 4, the rotation of the rolls is stopped and a cut is made through the sheet, over its entire extension parallel to the axis of the roller, either by manual operation of a suitable knife or by mechanism schematically shown, at A.

In the illustrated embodiment an auxiliary draw-off roller 5 of relatively small diameter is provided on a horizontal pivot adjacent the lower part of the upper, rising quadrant of roll 3. This pivot of the auxiliary roller lies on a line parallel to the axis of the heating roll 3. The peripheries of the two elements 3,5 are separated from one another by a suitable distance such as a few centimeters. This arrangement has the purpose of making it possible for the draw-off mechanism to "lift off" a portion of the calendered sheet 4 from the calendering roll for moving the lifted-off portion horizontally from its lifted-off position over a sheet depositing table, to be described later, while avoiding interference between the lift-off mechanism and the calendering mechanism. Advantageously the draw-off roller 5 has a periphery covered with rubber. The roller 5 has an electric motor drive providing a constant adjustable draw-off force; the drive itself is not shown but the direction in which it withdraws the sheet 4 is shown by an arrow, pointing to the right, in FIG. 3.

A counter roller 6 is disposed above the draw-off roller 5. This roller 6 is provided with means for raising it and lowering it. Pneumatic means including a compressed air cylinder 7 are shown for this latter purpose, this cylinder having an upper air inlet for lowering roller 6 and lower air inlet for raising this roller.

Rocking arms 8 are provided, one at each end of the axis of draw-off roller 5. The illustration shows one of these arms, located at the far end of this roller. The two arms are interconnected by a cross-bar 9, shown in section. This cross-bar is located a slight radial distance from the surface of draw-off roller 5. The bar 9 carries a plurality of suction cups 12, engagable with the surface of the calendered sheet 4 by counterclockwise rocking of the rocking arms 8. The suction cups 12 advantageously are resilient, and have resilient means 13 to insure full peripheral engagement of each cup with the sheet 4 on roll 3. Air can be evacuated from cups 12 by vacuum means (not shown) including vacuum ducts 12', 12" to each cup.

Advantageously both rocking arms 8 have gears or gear segments, pivoted on the axis of the draw-off roller 5 and indicated by broken lines in the drawing. These gears or segments are shown in mesh with gear racks 10, one at each end of roller 5. The gear racks can be reciprocated by motor means shown as compressed air cylinders 11, with lower air inlet means to rock the arms into the position of FIG. 1 and with upper air inlet means to rock the arms into the position of FIG. 2.

FIG. 1 shows an initial phase of the drawing-off operation. The suction cups 12 have been set down on sheet 4 in a lower portion of the upper right-hand quadrant of the heating roll 3, slightly below the longitudinal cut 4A which defines the ends of the sheet to be lifted off. When connected to vacuum, the cups firmly engage an edge region of the sheet. Compressed air is then admitted to the upper end of cylinders 11, whereby rocking arms 8 and cross-bar 9, with the suction cups 12 carrying the engaged edge region of sheet 4, are moved clockwise to the position of FIG. 2, between the draw-off rollers 5 and 6, which are spaced from one another to allow such movement of the suction cups and cup-supporting cross-bar. Advantageously, heating roll 3 is then rotated counter clockwise, see the arrow in FIG. 1, at a slow velocity adjusted to match the clockwise movement of the arms 8, cups 12, and edge portion of sheet 4.

Figure 2:
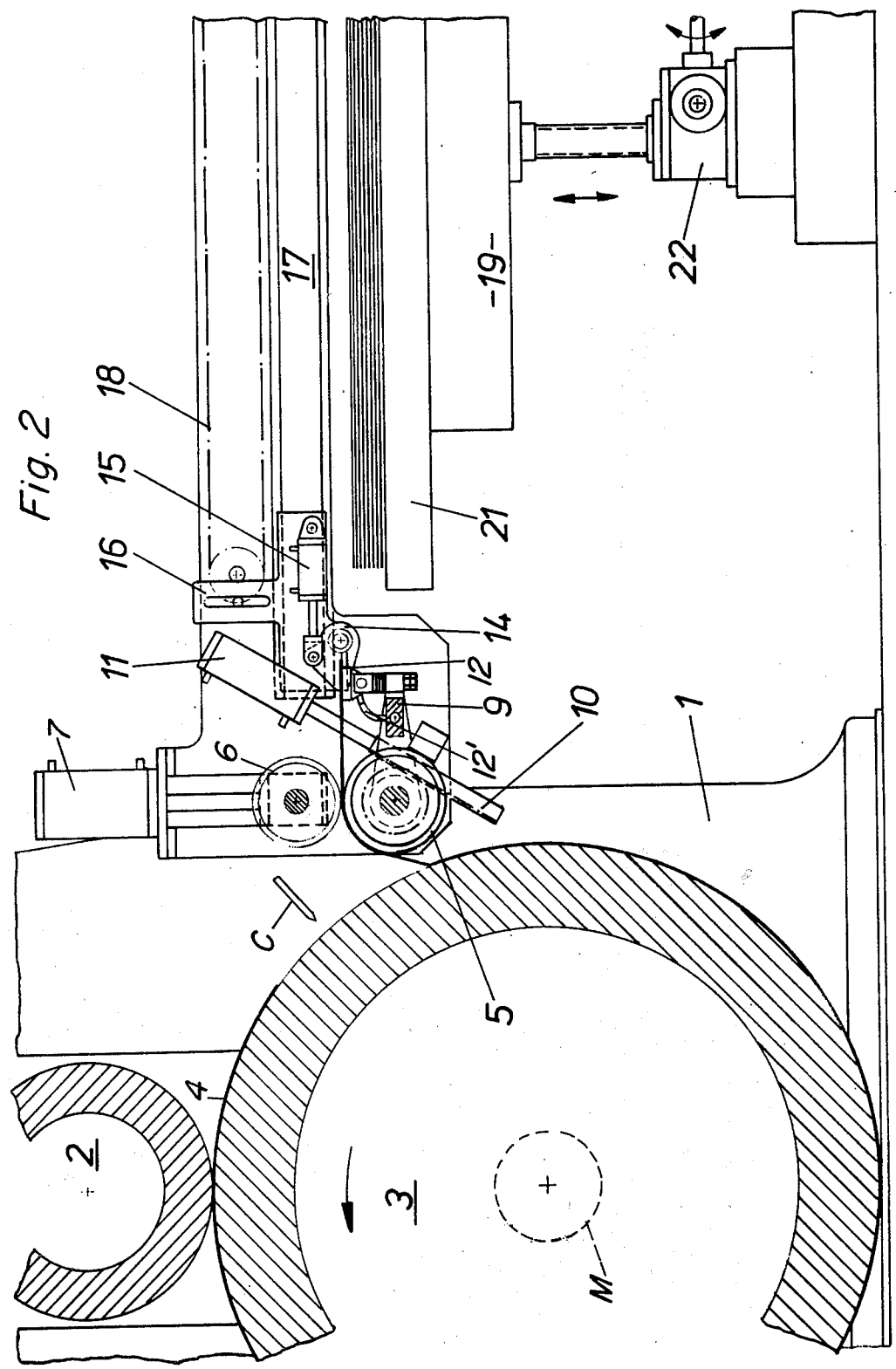
FIG. 2 is a similar view wherein the apparatus is shown in another position thereof.
Figure 4:
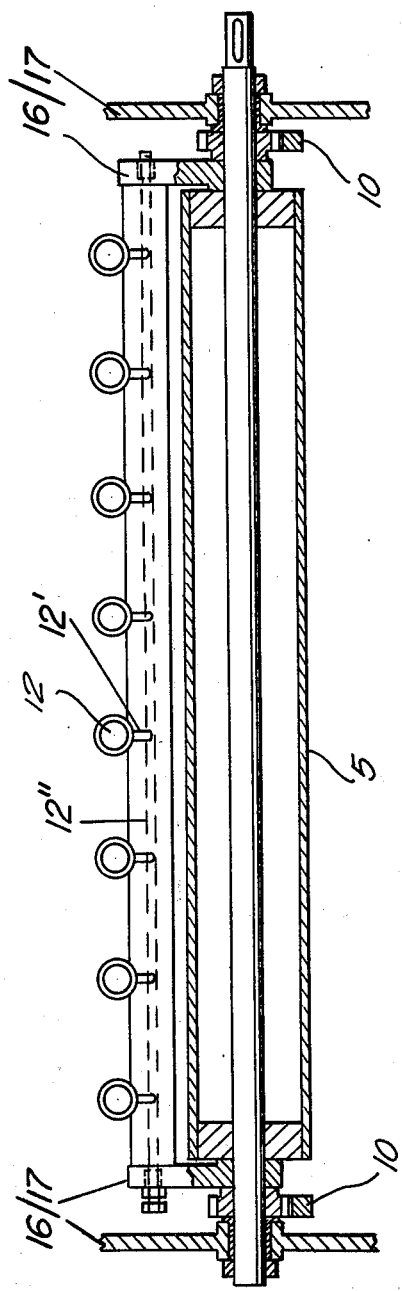
FIG. 4 is a partial view of the apparatus, taken along lines 4—4 in FIG. 1.

Thus the suction cups 12 reach the position shown in FIG. 2, in which the edge portion of sheet 4, between the suction cups and the draw-off roller 5, is located in horizontal orientation. Thereupon several operations are performed: air pressure is connected to a pneumatic operating mechanism 15 of sheet grippers 14, edge portions of sheet 4 having been fed into these grippers (also see FIG. 4); vacuum is disconnected from the suction cups 12 to release the sheet from these cups; the upper auxiliary roller 6 is lowered by its pneumatic motor 7; rotation of draw-off roller 5 is initiated (while the rotation of heating roll 3 is suitably adjusted, for example retarded); and grippers 14 with their pneumatic motors 15 are moved away from the calender rolls (in rightward direction in FIG. 2), on sleds 16 carrying the grippers. The sleds, and thereby the grippers, are suitably interconnected by a crossrod (not shown), similar to rod 9. The sleds are guided on straight horizontal rails 17. The sleds are driven along these rails by conveyor chains 18, driven by a suitable motor (not shown).

The sleds 16 and grippers 14 draw the sheet 4 over a horizontal table 19. When the grippers 14 and the edge of the sheet carried have reached suitable limit means 20, at the far end of table 19 or have slightly overrun such means, as shown, suitable limit switch means 20' are operated to open the grippers, thereby completing the depositing of sheet 4 on top of the pallet 21 of table 19. The operation of the said limit switch means also causes a small downward motion of table 19, to allow unimpeded return motion of grippers 14. This return motion is then initiated. It leads the grippers back into the position of FIG. 1, wherein the gripper sled drive is deactivated.

Figure 3:
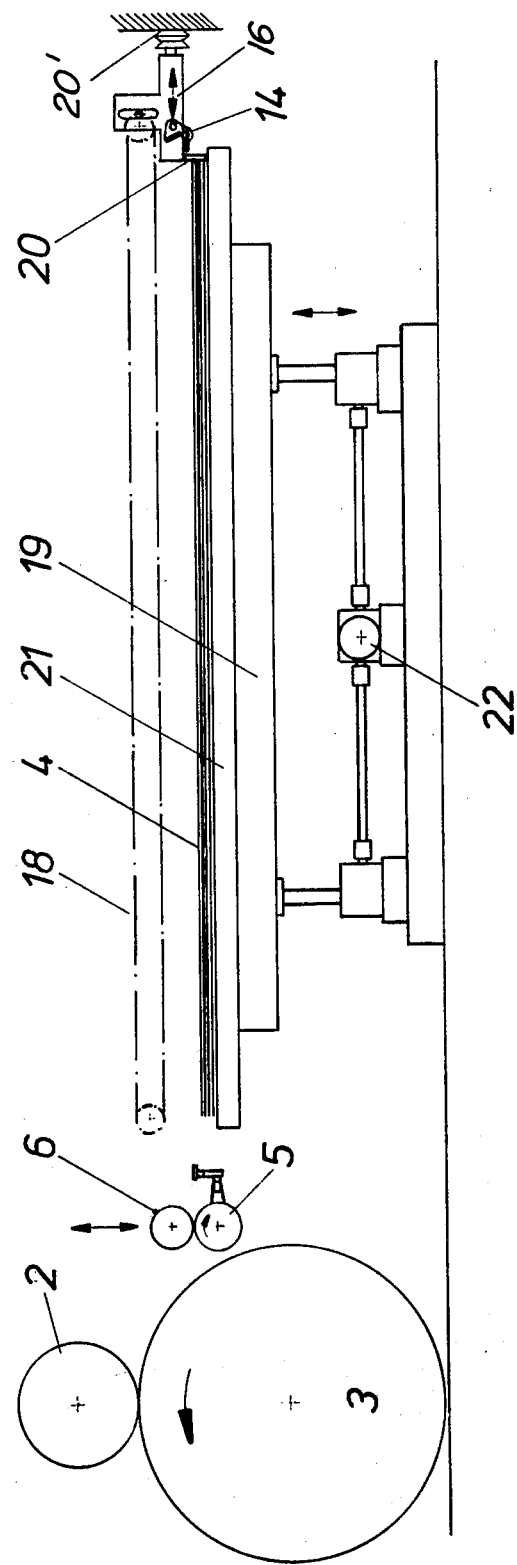
FIG. 3 is a generally similar but more complete view of the entire system, shown on a smaller scale.
Figure 5:
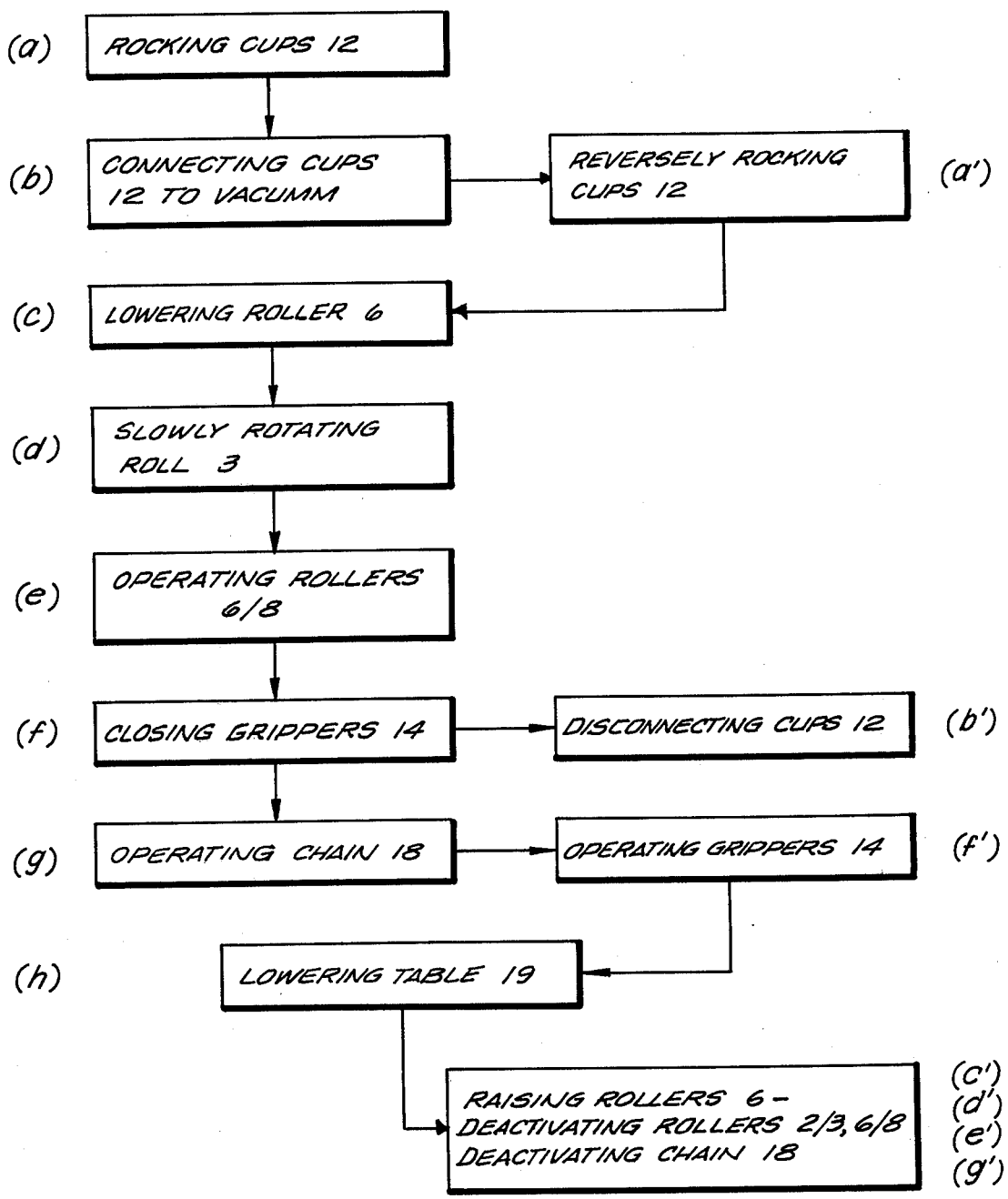
FIG. 5 is a block diagram of a control system for the apparatus shown in FIGS. 1 to 3.

Advantageously the system is provided with automatic control means, the arrangement of which is schematically shown by the block diagram of FIG. 5. This control advantageously has the following, successive stages, jointly comprising a new method of picking up and withdrawing a calendered sheet:

a. rocking the suction cups 12 about the pivot of their support arm 8 to establish the position of FIG. 2;

b. connecting the suction cups 12 to vacuum;

a'. reversely rocking the arms 8 and suction cups 12, with the edge portion of the sheet 4 carried thereby, into the horizontal position of this portion shown in FIG. 2;

c. lowering the draw-off roller 6 onto the sheet 4 and the draw-off roller 5;

d. effecting relatively slow, forward rotation of the heating roll;

e. initiating rotation of the draw-off rollers to draw the sheet from the heating roll;

f. causing the grippers 14 to close and engage the edge of the sheet while (f') disconnecting cups 12 from vacuum;

g. initiating motion of conveyor chain 18 to move sled 16 of grippers 14 over table 19;

f'. opening grippers 14 in the position of FIG. 3;

h. lowering table 19 slightly and c', d', e', g' reversing the above-mentioned operations c,d,e and g.

Differently summarized, it will be seen that the hot, calendered sheet 4 is picked up and withdrawn from roll 3 by suction cups 12, and in due course by grippers 14, preferably aided by rollers 5 and 6. It will also be seen that these devices for picking up and drawing off the sheet can readily be made of materials insensitive to the high temperature of the sheet. Moreover these devices can readily be provided in such numbers, and at such location as to distribute the picking-up and drawing-off forces, over the edge region of the sheet. The difficulties, formerly encountered, are avoided. Thereby the process repeats itself cyclically. Generally this process requires only about 5 to 10 seconds, which is considerably less than the time required for the calendering of a new sheet.

Finally it will be seen that the picking up, drawing off and depositing of the calendered sheets according to the invention is fully automatic. The manual forces, formerly needed for the purpose, as well as the dangers to human operators, involved in this difficult work are eliminated. The quality of the sheeting, removed from the calender is improved, as the former problems of manual removal are avoided. The drawing-off forces are uniformly distributed over the edge of the sheet; the work is performed efficiently, free of the troubles and delays which formerly were caused by the difficulties encountered by the workers.

What we claim and desire to secure by Letters Patent is:

1. Calender device for producing rubber-asbestos sheets, comprising:
   a calender unit including a heatable calender roll and a counter roll, for calendering an asbestos-carrying rubber solution into a hot, calendered layer surrounding the calender roll, the calender roll having more than 1 meter circumference and the two rolls having more than 1 meter length and having axes parallel to one another;
   means for cutting the layer on the heatable roll to provide a hot, calendered rubber-asbestos sheet, adhering to said roll and having more than one meter side length on all sides of the sheet;
   suction means located alongside the heatable roll for engaging an edge region of the hot, calendered sheet on said roll and for stripping the engaged edge region from said heatable roll, comprising a plurality of suction cups spaced apart along a line parallel to said axes, means for moving the suction cups into locations on and longitudinally spaced along the heatable roll and, with the edge region of the hot sheet engaged thereby, away from the heatable roll;
   a pair of draw-off rolls disposed adjacent to and smaller than the heatable roll, parallel to said axes for rotation to facilitate a movement of further portions of the hot sheet, away from the heatable roll regardless of adhesion of the rubber-asbestos of the sheet to said roll; and
   means for effecting the movement of the further sheet portions, while the sheet is still hot, comprising draw-off grippers engageable with the stripped edge region of the hot sheet, and a gripper device for longitudinally moving the grippers, engaged with the edge region of the hot sheet, away from the heatable roll.

2. Calender device according to claim 1 wherein said gripper device includes a carrier parallel to the axis of the heatable roll, the grippers being distributed along said carrier, and means for jointly opening and closing said grippers for the effecting of the movement of further sheet portions while the sheet still is hot.

3. Calender device according to claim 2 including a table located below the further sheet portion to receive the same pursuant to its movement away from the heatable roll, and a pair of sleds, one at each end of said carrier, for supporting said carrier and for moving it, and the grippers, over said table, with the hot sheet.

4. Calender device according to claim 3 including conveyor chain means for moving said sleds with the carrier, the grippers, and the hot sheets, along the table.

5. Calender device according to claim 4 wherein said table has means for vertically adjusting the same for receiving successive, hot sheets.

* * * * *